United States Patent [19]

Watanabe et al.

[11] Patent Number: 4,868,351
[45] Date of Patent: Sep. 19, 1989

[54] INPUT PEN DATA INPUT TABLET

[75] Inventors: Shoyu Watanabe; Masaaki Nakano; Shuji Iwata; Osamu Nakajima; Yusaku Saitoh, all of Hyogo, Japan

[73] Assignee: Mitsubishi Denki Kabushiki Kaisha, Tokyo, Japan

[21] Appl. No.: 161,495

[22] Filed: Feb. 29, 1988

[30] Foreign Application Priority Data

Mar. 9, 1987 [JP] Japan ................................. 62-53470
Apr. 10, 1987 [JP] Japan ................................. 62-89553

[51] Int. Cl.⁴ .......................................... G08C 21/00
[52] U.S. Cl. .................................................... 178/19
[58] Field of Search .................................. 178/18, 19

[56] References Cited

U.S. PATENT DOCUMENTS

| | | | |
|---|---|---|---|
| 3,819,857 | 6/1974 | Inokuchi | 178/19 |
| 3,846,580 | 11/1974 | Brenner | 178/19 |
| 4,491,688 | 1/1985 | Schaub et al. | 178/18 |
| 4,542,261 | 9/1985 | Behnke | 178/18 |
| 4,723,056 | 2/1988 | Tamaru et al. | 178/19 |

FOREIGN PATENT DOCUMENTS 8222962.7 11/1982 Fed. Rep. of Germany .
3214426 11/1983 Fed. Rep. of Germany .

Primary Examiner—Stafford D. Schreyer
Attorney, Agent, or Firm—Bernard, Rothwell & Brown

[57] ABSTRACT

An input pen of data input tablet comprising a magnetic core which is positioned at the data input tablet side end of a pen case and passes a magnetic flux generated from the data input tablet, a conductive holder for holding this core, a detection coil wound around on the core, and a lead wire led out from the coil in close contact with the holder. The magnetic flux generated by the current flowing into electrodes formed in the data input tablet is detected by the detection coil, thereby detecting a position on the data input tablet. A protective tube which covers at least the detection coil and magnetic core to protect the coil and core is also provided. An annular shield case formed of metal or other conductive material and functioning as an electromagnetic and electrostatic shield near the protective tube is provided in another embodiment.

9 Claims, 4 Drawing Sheets

INPUT PEN DATA INPUT TABLET

BACKGROUND OF THE INVENTION

1. Field of the Invention

The present invention relates to an input pen of a magnetic coupling type data input tablet for inputting characters and graphs.

1. Description of the Prior Art

FIG. 1 is a sectional view showing a conventional input pen with a data input tablet disclosed in for example Laid-Open Japanese Pat. No. 60-134928. In this drawing, 2 designates a detection coil; 4, a lead wire; 5, a switch; 6, a pen case; 7, a shielded wire; 10, a pen shaft; and 11, a magnetic pipe fitted in the tip of the pen shaft 10 projecting out from the lower end of the pen case 6. On the outer surface of this magnetic pipe 11 is wound the above-mentioned detection coil 2. 12, 13 designate electrodes formed on the data input tablet, and 14, input plate of the data input tablet.

Next, the operation of this device will be explained below. In the data input tablet, a plurality of electrodes 12 and 13 intersect with each other at right angles under the surface of the input plate 14, the electrodes 12, 13 intersecting with each other at right angles being disposed electrically separated. The alternating current is supplied to two parallel lines within these electrodes 12 and 13 from outside to generate a magnetic field. When the detection coil 2 is placed in this magnetic field generated by these two lines, there is generated an induced voltage in the detection coil 2. Applying the alternating current to different electrodes in succession can indicate coordinates on the plate surface by the induced voltage in the detection coil. The voltage thus induced in the detection coil 2 is introduced to the switch 5 by the lead wire 4. The switch 5 is turned on as the input pen is pressed against the input plate 14, and the lead wire 4 is connected to the shielded wire 7, which is connected to the external circuit (not illustrated) of the input pen.

The voltage induced in the aforementioned detection coil 2 is determined by magnetic field strength generated at the surface of the input plate 14, the distance from the input plate 14 to the detection coil 2, and the number of turns and winding diameter of the coil.

The input pen of the conventional data input tablet, being of the constitution as stated above, has the problem that a noise is easily detected by the lead wire 4 of the detection coil 2 which extends a substantial length along the pen shaft 10 and furthermore the detection coil 2 which is exposed is likely to be broken because it comes in contact with some other parts during input pen assembling and operation.

Furthermore, there are problems that detecting accuracy is lowered because the magnetic flux generated by other than the electrodes 12 and 13 is detected as induced voltage by the detection coil 2 and an electrostatic noise resulting from capacity coupling between the detection coil 2 and the data input tablet circuit is detected by the detection coil 2.

SUMMARY OF THE INVENTION

The present invention has been accomplished in an attempt to solve the aforementioned problems, and has as its object the provision of an input pen of data input tablet which is capable of preventing the entrance of noise caused by the aforementioned lead wire and has durability great enough to prevent breakage of the lead wire.

Another object of the present invention is to provide an input pen of data input tablet of high position-detecting accuracy which will neither detect an unnecessary magnetic flux generated at other than the electrodes nor detect an unnecessary electrostatic noise.

The input pen of data input tablet of the present invention comprises a pen case, a magnetic core which is positioned at the data input tablet side end of this pen case and to which the magnetic flux generated from the data input tablet is supplied, a conductive holder set in the pen case and holding the magnetic core, a detection coil wound around the magnetic core to detect a magnetic field generated from the data input tablet, and a lead wire led out from the detection coil in close contact with the conductive holder. This input pen further comprises a protective tube which covers at least the detection coil and the magnetic core to detect a position on the data input tablet as the detection coil detects the magnetic field produced by the current flowing into electrode formed in the data input tablet.

Therefore, in the input pen of the present invention, a protective tube covers at least the magnetic core and the detection coil, and a lead wire from the detection coil is fixed close to the conductive holder, thereby preventing wear of the magnetic core and breakage of the detection coil. Further, a magnetic shielding function provided by passing mangetic flux through off the conductive holder prevents noise caused by the lead wire.

Furthermore, in the input pen of the data input tablet of the present invention, near the protective tube described above there is arranged an annular shield case consisting of an electrical conductor of metal or other conductive material. Therefore, in the input pen of the present invention, the magnetic flux flowing from the outside of the shield case into its inside is shielded by an electromagnetic shielding function so that the magnetic flux will not make interlinkage with the detection coil, thus eliminating a noise caused by capacity coupling between the detection coil and the data input tablet circuit by the electrostatic shielding function. In other words, the magnetic flux produced at other than the electrodes of the data input tablet is shielded by the shield case, but the magnetic flux which is produced at the electrodes located immediately under the input pen and will not interlink the shield case and will make interlinkage with the detection coil,, being detected as a signal.

DETAILED DESCRIPTION OF THE PREFERRED EMBODIMENTS

Figure 1:
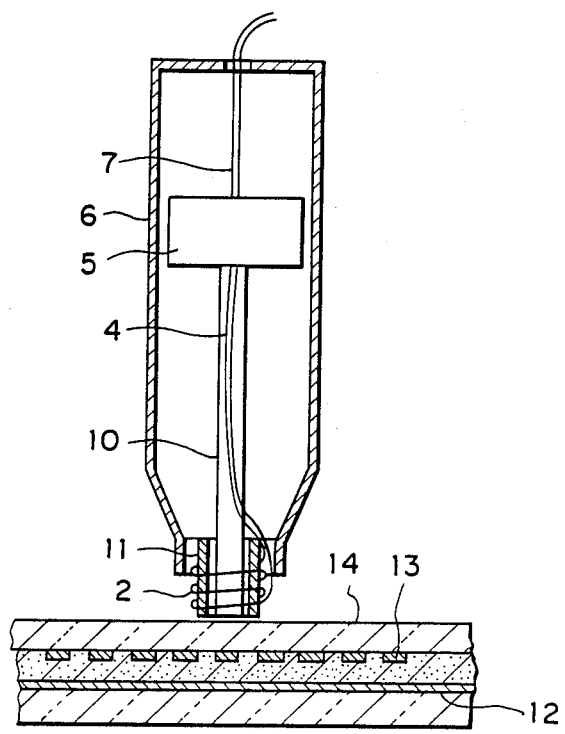
FIG. 1 is a longitudinal sectional side view showing a conventional input pen.

Hereinafter, exemplary embodiments of the present invention will be described with reference to the accompanying drawings. For parts appearing in each embodiment described below which correspond to the parts of the conventional input pen described by referring to FIG. 1, the same reference numerals are used for simplification of its description.

Figure 2:
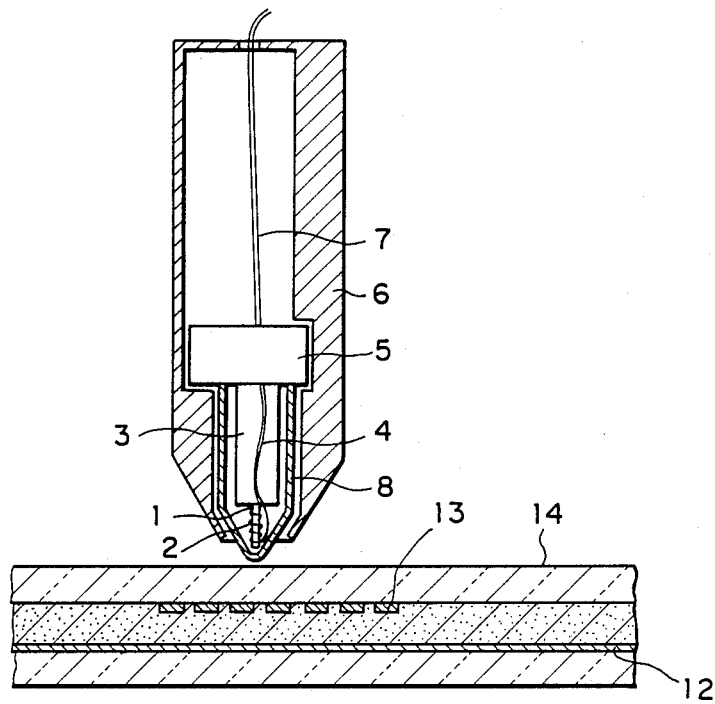
FIG. 2 is a longitudinal sectional side view showing an input pen of a first embodiment of the present invention.

FIG. 2 shows the first embodiment. In this drawing, numeral 3 is a conductive holder which is set in a pen case 6 and holds a magnetic core 1. A lead wire 4 is led out of a detection coil 2 along and, in close contact with, this conductive holder 3. Numeral 8 is a protective tube which covers at least the magnetic core 1 and the detection coil 2.

Next, the operation of this device will be explained. When the tip of the input pen is pressed against the surface of an input plate 14, a switch 5 is turned on and at the same time the magnetic field generated by electrodes 12 and 13 intersecting at right angles with each other acts on the detection coil 2 through the a protective tube 8, thus producing an induced voltage in the detection coil 2. This induced voltage is led externally via the lead wire 4 and a shielded wire 7 which are connected when the switch 5 is turned on. This operation is the same as the example of conventional device shown in FIG. 1.

In the above-mentioned operation, the magnetic core 1, being covered with the protective tube 8, will not come in direct contact with the input plate 14 and therefore will not wear. Also, the detection coil 2, being covered with the protective tube 8, will not come in contact with other parts and will not be damaged. The lead wire 4 is led out in close contact with the conductor holder 3, which blocks noise from the lead wire 4 by an electromagnetic shielding effect of the conductive holder 3.

Figure 3:
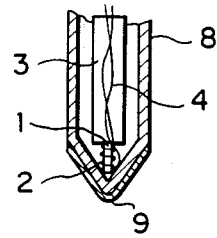
FIG. 3 is a longitudinal sectional side view showing the tip of the aforementioned input pen as an example of modification of the first embodiment.

FIG. 3 shows an example of modification of the first embodiment, wherein a wear-resistant thin film 9 is formed on the outside surface of the protective tube 8. This construction prevents wear of the protective tube 8, thus improving its durability.

Figure 4:
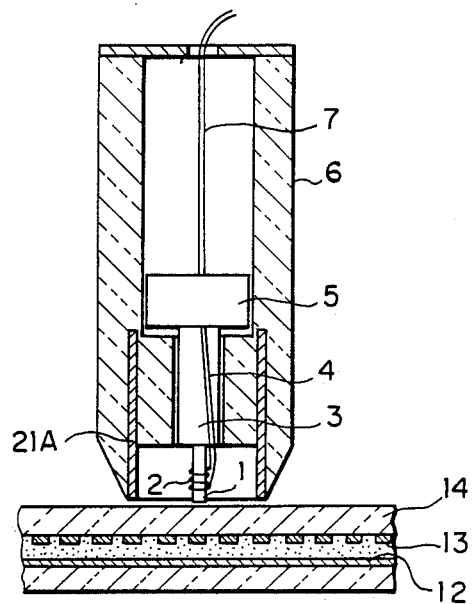
FIG. 4 is a longitudinal sectional side view showing an input pen of a second embodiment of the present invention.

Next described is the second embodiment of the present invention with reference to FIG. 4. In this drawing, numeral 21A indicates a shield case consisting of for example, an electrical conductor of metal and the like, and the shield case 21A is disposed in the pen case 6 such that its upper end is nearly at the same level as the upper end of the holder 3, and its lower end nearly at the same level as the lower end of the magnetic core 1. This shield case 21A can also function with the protective tube of the first embodiment previously stated.

The operation of the shield case 21A is as follows.

When the input pen is pressed on the input plate 14, the switch 5 is turned on to electrically connect the lead wire 4 to the shielded wire 7. The induced voltage is conducted externally of the pen through the lead wire 4, the switch 5 and the shielded wire 7.

When the magnetic field generated at the electrodes 12 and 13 is detected by the detection coil 2, since the detection coil 2 is covered with the shield case 21A, the magnetic flux from the outside of the shield case 21A will be intercepted by the electromagnetic shielding of the shield case 21A and accordingly will not make interlinkage with the detection coil 2.

The magnetic flux generated from the electrodes 12 and 13 immediately under the input pen which does not interlink the shield case 21 will not be affected by the electromagnetic shielding action of the shield case 21A, and accordingly the magnetic flux will interlink the detection coil 2, being detected as a signal.

The noise resulting from the capacity coupling between the detection coil 2 and the data input tablet circuit will be shut off by the electrostatic shielding action of the shield case 21A.

Figure 5:
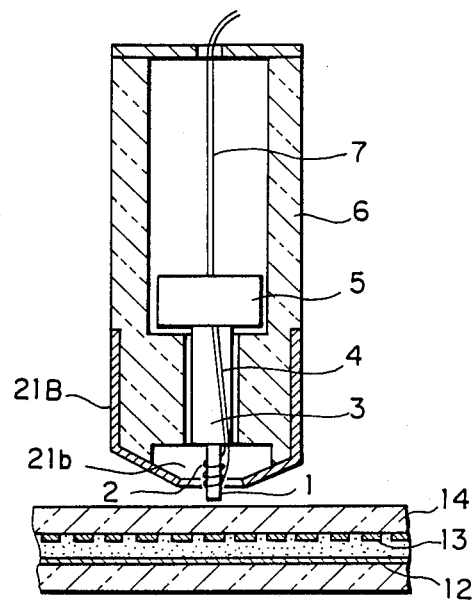
FIG. 5 is a longitudinal sectional side view showing an input pen of a third embodiment of the present invention.

In the embodiment described above, an annular shield case was indicated as the shield case 21A; as shown in the third embodiment in FIG. 5, however, a shield case 21B provided with an opening section 21b through which the tip of the magnetic core 1 projects may be disposed on the outside surface of the pen case 6.

Figure 6:
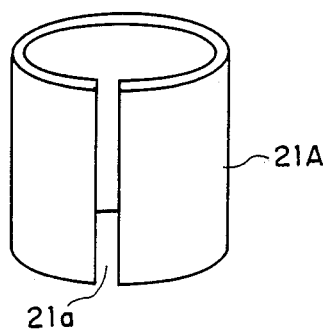
FIG. 6 is a perspective view showing an example of modification of a shield case.

Also, the shield case 21A may be such as is provided with an axial slit 21a as shown in FIG. 6, so that the shield case 21A will be pressed with its elasticity into contact with, and held in the pen case 6. The shield case 21B may also be of a similar construction having a slit.

Furthermore, the tip of the magnetic core 1 projecting out of the shield cases 21A, 21B in the embodiments shown in FIGS. 4 and 5, may be disposed projecting merely into the shield case 21A, 21B without projecting out of the shield case 21A, 21B.

Furthermore, the shield case 21A, 21B may be formed not only of a conductive thin plate but also of a thin film by evaporation.

Figure 7:
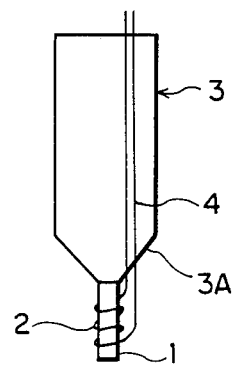
FIGS. 7 and 8 are views showing examples of modifications of a conductive holder.
Figure 8:
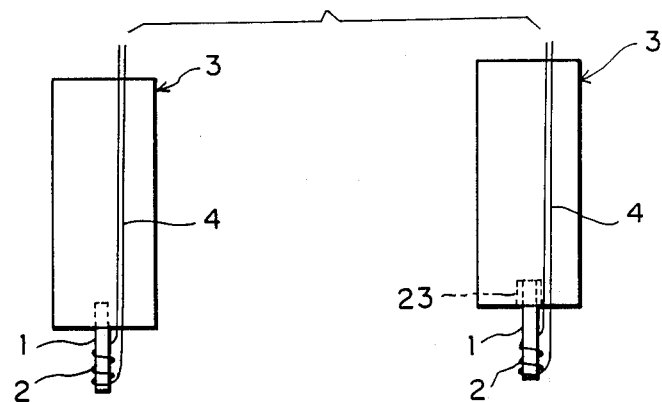

FIGS. 7 and 8 show examples of modifications of the conductive holder 3. That is, in the embodiments described above, the conductive holder 3 indicated is of a columnar type; however, the data input tablet side end of the conductive holder 3 may be of a taper 3A, such as a chamfered tip of a columnar part, as indicated by the example in modification in the front view of a major part in FIG. 7. In the case of this example of modification, in addition to the similar effect achieved by each of the embodiments described above, there is also the effect that since the magnetic flux interlinking the detection coil 2 flows parallelly with the chamfered face, the direction of the magnetic flux near the magnetic core 1 is not disturbed. Furthermore, the center shaft of the columnar conductive holder 3 may be provided with a slot 23 for mounting the magnetic core 1 as illustrated in the front view of a major part showing another example of modification in FIG. 8.

According to the present invention, since the magnetic core and the detection coil wound around on its outside surface are so constructed as to be covered with a protective tube as described in the first embodiment, there can be gained such effect as freedom from wear of the magnetic core and breakage of the detection coil wire, improvement in durability, and reduction of noise mixture in the lead wire, thereby obtaining a highly dependable data input pen.

Furthermore, as previously described in the second and third embodiments, according to the present invention, since a conductive shield case is arranged near the protective tube which holds the holder, the magnetic core and the detection coil, there also can be obtained such effect that noise is reduced by the electromagnetic and electrostatic shield of the shield case, thus improving the position detecting accuracy.

What is claimed is:

1. An input pen of a data input tablet comprising a pen case, a magnetic core which is positioned at said data input tablet side end of said pent case and passes a magnetic flux generated from said data input tablet, a conductive holder housed in said pen case to hold said magnetic core, a detection coil wound around on said magnetic core to detect a magnetic field produced from said data input tablet, and a lead wire led out from said detection coil in contact with said conductive holder, a position on the data input tablet being detected by said detection coil detecting the magnetic field produced by a current flowing into electrodes formed in said data input tablet, said input pen further comprising a protective tube for covering at least said detection coil and said magnetic core.

2. An input pen of a data input tablet as claimed in claim 1, in which said protective tube includes a wear-resistant thin film formed over its outside surface at least at the extreme end thereof.

3. An input pen of a data input tablet as claimed in claim 1, in which an annular shield case formed of a conductor of metal or other conductive material is arranged to encircle said detection coil and to permit said detection coil to be exposed at an opening in said shield case.

4. An input pen of data input tablet as claimed in claim 3, in which said shield case is provided with an opening so that the tip of said magnetic core will be exposed thereinto, and fixed to said pen case, with one end of its annular portion closed.

5. An input pen of data input tablet as claimed in claims 3 or 4, in which said shield case has an axially formed slit, which provides said shield case with elasticity.

6. An input pen of data input tablet as claimed in claims 1 or 2, in which said protective tube further houses said conductive holder.

7. An input pen of data input tablet as claimed in claims 3 or 4, in which said shield case further houses said conductive holder.

8. An input pen of data input tablet as claimed in claims 1, 2, 3 or 4 in which said conductive holder has a tapered end on the side of said data input tablet.

9. An input pen of input data tablet as claimed in claims 1, 2, 3, or 4, in which said conductive holder has a slot formed in the end on the side of said data input tablet to receive said magnetic core therein.

* * * * *

UNITED STATES PATENT AND TRADEMARK OFFICE
CERTIFICATE OF CORRECTION

PATENT NO. : 4,868,351
DATED : September 19, 1989
INVENTOR(S) : SHOYU WATANABE ET AL.

It is certified that error appears in the above-identified patent and that said Letters Patent is hereby corrected as shown below:

Front Page, Col. 1, [54], line 1, after "PEN" insert --OF--.

Col. 1, line 1, after "PEN" insert --OF--.

Col. 2, line 22, "electrode" should be --electrodes--;
Col. 2, line 49, delete "," (second occurrence).

Col. 3, line 25, delete "a".

Col. 4, line 39, "in" (first occurrence) should be --of--.

Col. 5, line 3, "pent" should be --pen--.

Col. 6, line 22, delete "," (third occurrence).

Signed and Sealed this

Eleventh Day of December, 1990

Attest:

HARRY F. MANBECK, JR.

*Attesting Officer*  *Commissioner of Patents and Trademarks*